MAGNETIC AMPLIFIER FOR SERVO USE

Filed Sept. 10, 1963 2 Sheets-Sheet 1

INVENTORS
CHIYOJI KAWAGUCHI and KATSUYUKI ARA
BY Otto John Munz.
ATTORNEY

INVENTORS.
CHIYOJI KAWAGUCHI and KATSUYUKI ARA
BY Otto John Munz
ATTORNEY.

United States Patent Office 3,332,026

Patented July 18, 1967

3,332,026

MAGNETIC AMPLIFIER FOR SERVO USE

Chiyoji Kawaguchi and Katsuyuki Ara, Naka-gun, Ibaraki-ken, Japan, assignors to Nihon Genshiryoku Kenkyu Sho, Tokyo, Japan Filed Sept. 10, 1963, Ser. No. 307,917

Claims priority, application Japan, Sept. 22, 1962, 37/41,560

1 Claim. (Cl. 330—8)

This invention relates to a magnetic amplifier for servo use utilizing one magnetic core, and particularly, to a magnetic amplifier in which a push-pull output can be obtained by utilizing only one magnetic core without causing substantially mutual interferences.

Heretofore, the push-pull magnetic amplifier required generally four magnetic cores. In principle, amplification effected by means of two magnetic cores is possible; however this method is not always practicable, since the mutual interference between each reactor is sometimes considerable. When four magnetic cores are utilized, it is a consequence that the rectifiers and other parts used are numerous. In addition, the cost for the winding of reactors and for the parts are substantially expensive. Therefore, despite the recognized reliability of the magnetic amplifier, the vacuum tube amplifier is still used widely. In accordance with this present invention a push-pull output can be obtained by utilizing only one magnetic core. Thus, the mutual interference between reactors cannot exist.

The object of this invention is to provide a magnetic amplifier for servo use in which only one magnetic core is utilized in order to obtain a push-pull output.

Figure 1:
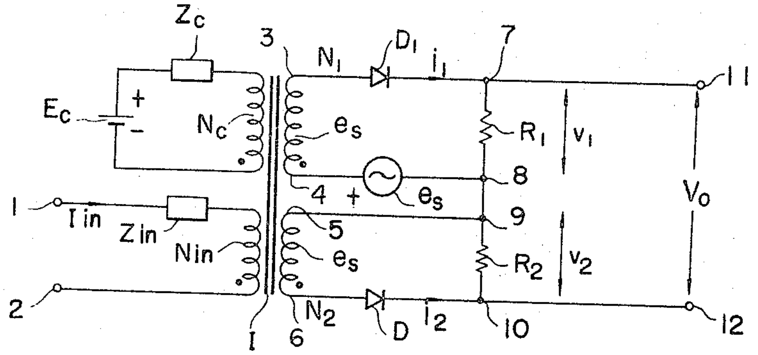
Figure 2:
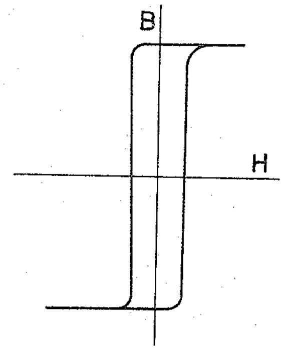
Figure 3:
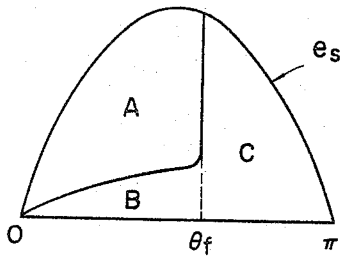
Figure 4:
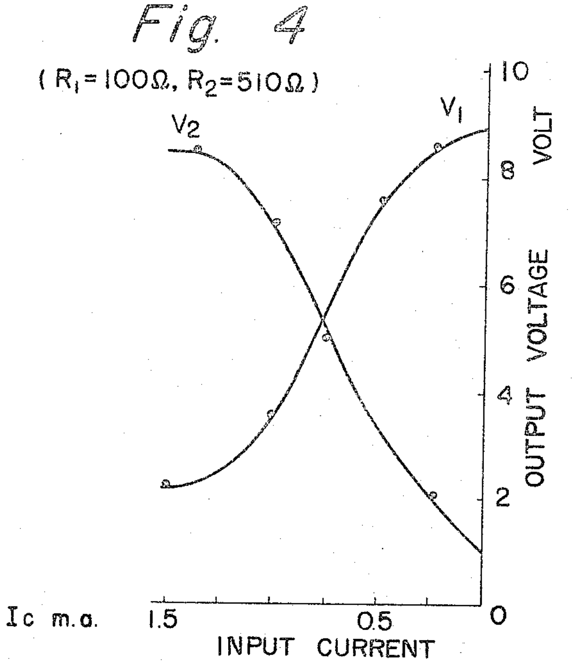
Figure 5:
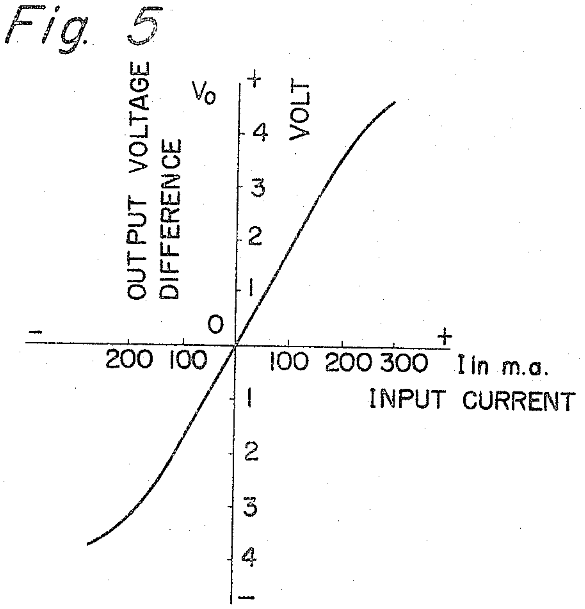

The objects and advantages of this invention will be readily apparent from the following detailed description taken in connection with the accompanying drawings, in which:

FIG. 1 is a circuit of a magnetic amplifier for servo use provided in accordance with this invention, FIG. 2 shows the magnetizing characteristics which control the magnetic core utilized in the magnetic amplifier for servo use provided in accordance with this invention, FIG. 3 is a diagram explaining the operation and the wave in the half cycle of the electrical power source used in the magnetic amplifier of this invention, FIG. 4 is a diagram showing the characteristic curve of each output of the magnetic amplifier of this invention, and FIG. 5 is an example of the push-pull characteristic curve obtained by the magnetic amplifier for servo use shown in FIG. 1.

In FIG. 1 is shown a circuit connection diagram showing the principle of the magnetic amplifier for servo use provided in accordance with this invention and a core 1 has a rectangular characteristics shown in FIG. 2. Core 1 has four windings: a bias winding $N_c$, an input winding $N_{in}$, a gating winding $N_1$ and a push-pull winding $N_2$. The winding $N_c$ is connected to a direct current source $E_c$ through an impedance $Z_c$, and the winding $N_{in}$ is connected to input terminals 1 and 2 through an impedance $Z_{in}$. Terminal 3 of the winding $N_1$ is connected to an end 7 of a resistance $R_1$ through a diode $D_1$ and a terminal 4 of the winding $N_1$ is connected to an end 8 of the resistance $R_1$ through an alternating current source $e_s$. A terminal 5 of the winding $N_2$ is connected to an end 9 of a resistance $R_2$ and a terminal 6 of the winding $N_2$ is connected to an end 10 of the resistance $R_2$ through a diode $D_2$. End 7 of the resistance $R_1$ and end 10 of the resistance $R_2$ are connected to output terminals 11 and 12, respectively.

The magnetic amplifier shown in FIG. 1 operates as follows:

Assuming that the polarity of the source voltage $e_s$ is as shown in the figure, during the gate period an electric potential $e_2$ is induced in the winding $N_2$ together with an electric potential $e_1$ applied across winding $N_1$.

$$e_2=\frac{N_2}{N_1}e_1$$

Also assuming that at the time $\omega t=\theta_f$ the magnetic cores are saturated, the current $i_1$ which passes through the diode $D_1$ is $i_1=e_s/R_1$ and $e_2=0$. Therefore, only during the period 0 to $\theta_f$ the voltage $v_2$ appearing across the two ends of the resistance $R_2$ is as follows:

$$v_2=e_2$$

Meanwhile, during the period 0 to $\theta_f$ the voltage $v_1$ appearing across the two ends of the resistance $R_1$ is as follows:

$$v_1=e_s-e_1$$

and during the period $\theta_f$ to $\pi$ the voltage $v_1$ is as follows:

$$v_1=e_s$$

The mean values of $\bar{v}_1$ and $\bar{v}_2$ of the voltage $v_1$ and $v_2$ are represented, respectively, by the following formulae during the half cycle of the gating period.

$$\bar{v}_1=2f\left(\frac{2Em}{\omega}-N_1\Delta\phi_r\right) \tag{1}$$

$$\bar{v}_2=2fN_2\Delta\phi_r \tag{2}$$

where $Em$=the maximum value of the source voltage $e_s$
$f$=frequency
$\omega$=angular frequency
$\Delta\phi_r$=reset magnetic flux given through the winding $N_c$ The wave forms of the voltages $v_1$ and $v_2$ are given in FIG. 3 and the values $\bar{v}_1$ and $\bar{v}_2$ of the voltages $v_1$ and $v_2$ are also given as follows:

$$\pi.\bar{v}_1=\int_0^{\theta_f}B\,d\theta+\int_{\theta_f}^{\pi}C\,d\theta \tag{3}$$

$$\pi.\bar{v}_2=\int_0^{\theta_f}A\,d\theta \tag{4}$$

If the reset magnetic flux is chosen so that $\overline{v_1}=\overline{v_2}$, the differential output voltage $V_o$ across output terminals 11 and 12 is zero; however, when the reset magnetic flux is controlled by means of the signal given by the winding $N_{in}$, a positive or a negative output is obtained between the output terminals in accordance with the sign of the input signal. In order to enlarge the linear region of the output it is necessary to select the substantially center portion of the half cycle ($0\sim\pi$) of the biasing reset magnetic flux given by the winding $N_c$. To achieve this effect the value of the voltage $v_1$ between 0 and $\pi/2$, that is the value, as shown in Equation 3, $$\int_0^{\theta_f}=\frac{\pi}{2}B\,d\theta$$

should be made extremely small, and therefore, between the gate periods it must follow:

$$i_2R_2>>i_1R_1$$

Since the magnetic core is not saturated between the gate periods, it follows:

$$i_1N_1>i_2N_2$$

When $N_1=N_2$ is assumed so that the individual characteristics are the same, it must follow:

$$R_2>>R_1$$

In FIG. 5, an example of an experimental data is shown when it is assumed that $$R_2=5R_1$$
$$N_1=N_2$$

As stated above, in accordance with this invention, a magnetic amplifier whose characteristics are nearly the same as those of the prior art is obtained by utilizing only one magnetic core and two rectifiers. The construction of the magnetic amplifier is extremely simple, and therefore, the cost is low.

While one embodiment of the present invention is disclosed in the figures, it is recognized that the scope of the present invention is not limited thereto and it is therefore intended that the scope of the present invention be defined by the scope of the appended claim.

What is claimed is:

A magnetic amplifier for servo use comprising:
only one magnetic core;
a bias winding;
an input winding;
a gating winding connected across a first diode, a first resistance, and an alternating current source in series;
a push-pull winding connected across a second diode and a second resistance in series, each of said windings being wound on said magnetic core;
and means for providing a differential output between the output of said gating winding and the output of said push-pull winding across a pair of output terminals, said means comprising said resistances connected in series across said output terminals, said bias winding causing said differential output to be zero when no input signal exists in said input winding, a positive and negative output being obtained in accordance with the polarity of the input signal applied to said input winding.

References Cited

UNITED STATES PATENTS

| | | | |
|---|---|---|---|
| 2,953,751 | 9/1960 | Lynn et al. | 330—8 |
| 2,964,695 | 12/1960 | Fay et al. | 330—8 X |

ROY LAKE, *Primary Examiner.*

N. KAUFMAN, *Assistant Examiner.*